(12) United States Patent
Scharber et al.

(10) Patent No.: US 6,374,290 B1
(45) Date of Patent: Apr. 16, 2002

(54) SELF MODERATED VIRTUAL COMMUNITIES

(75) Inventors: John M. Scharber, Livermore; Christopher P. Healey, San Francisco, both of CA (US)

(73) Assignee: Cacheflow, Inc., Sunnyvale, CA (US)

( * ) Notice: Subject to any disclaimer, the term of this patent is extended or adjusted under 35 U.S.C. 154(b) by 0 days.

(21) Appl. No.: 09/283,677

(22) Filed: Apr. 1, 1999

(51) Int. Cl.⁷ .............................................. G06F 13/00
(52) U.S. Cl. ....................... 709/205; 709/225; 709/313; 709/329
(58) Field of Search ................................. 709/203, 205, 709/217, 219, 223, 224, 225, 313, 328, 329

(56) References Cited

U.S. PATENT DOCUMENTS 5,835,087 A  * 11/1998 Herz et al. .................. 345/327
5,987,440 A  * 11/1999 O'Neil et al. ................. 705/44

* cited by examiner

Primary Examiner—Viet D. Vu
(74) Attorney, Agent, or Firm—Blakely Sokoloff Taylor & Zafman LLP

(57) ABSTRACT

A method of server operation including connecting a plurality of clients to the server and establishing a profile for each of the plurality of clients. A first virtual community is formed with a first group of clients out of the plurality of clients based on the profile for each of the plurality of clients. A first group of ratings is assigned to the first virtual community based on the profile for each of the plurality of clients. A first rating is assigned to a first set of article groups. The first virtual community is provided with access to the first set of article groups if the first rating of the first set of article groups is within the first group of ratings of the first virtual community.

11 Claims, 5 Drawing Sheets

ND VIRTUAL
SELF MODERATED VIRTUAL COMMUNITIES

FIELD OF THE INVENTION

This invention relates to the field of computer networking and, more specifically, to the moderation of discussion on computer networks.

BACKGROUND

A popular application of computer networking is a world wide system of newsgroups referred to as net news or USENET. Newsgroups are specialized forums in which users with a common interest can exchange information in the form of articles, messages, questions, etc. (hereinafter "articles"). Thousands of newsgroups exist on technical and non-technical topics including computers, science, recreation, politics, and sex. Each newsgroup has its own style, etiquette, and custom. Individuals interested in a particular topic can subscribe to a related newsgroup containing articles on that topic. Articles are stored in a database that allows subscribers to access the articles using a computer program known as a news reader. The database can be one or more servers that allows subscribers to request only the articles they wish to see, without having to wastefully duplicate the storage of a copy of each article on each user's computer. Typically, a news reader checks a file to see which newsgroups a user subscribes to. The news reader then displays a summary of unread articles which can be selected from the server for reading. News readers also allow users to post their own articles on the USENET. These postings may be responses to or comments on previously posted articles which, in turn, may also be responded to creating a discussion thread.

Some of the articles that are posted, however, may be considered offensive or obscene to certain newsgroup users. Furthermore, the United States Supreme Court has recognized that a State may regulate obscene material without infringing on an individual's First Amendment rights. To be obscene, a publication must, taken as a whole, appeal to the prurient interest, must contain patently offensive depictions or descriptions of specified sexual conduct, and on a whole have no serious literary, artistic, political, or scientific value. Furthermore, obscenity is to be evaluated under the standards of the community. Although First Amendment limitations on State power does not vary from community to community, the Court did not require a jury to apply a national community standard when evaluating a publication for obscenity. Rather, the particular community standard to be used is based on the facts in each case. As such, some articles posted on newsgroup servers may be considered legally obscene based on which community standard is used. However, material deemed legal appropriate by a community as a whole may still be considered obscene to some individuals within that community. A news provider will generally not edit news content unless notified by a user that the content is considered by them to be obscene or illegal (e.g. violates copyright laws).

One solution to this problem is to have individuals use a killfile program which specifies that articles with a certain subject or from a certain person are to be discarded upon arrival, prior to being displayed. This solution, however, does not enable an effective screen based on the content of articles. Another problem with this solution is that as new news groups and new individuals are continually added, the killfile must be continually modified.

Another solution is to have the newsgroup moderated. A moderated newsgroup is one in which only moderators can post articles to the newsgroup. All postings to a moderated newsgroup are automatically sent to the moderator, who posts articles that are deemed appropriate and discards the rest. This solution, however, leaves the screening process to the discretion of a moderator. Furthermore, a moderator may not been able to effectively screen through a high volume of articles especially when different users, possibly constituting different communities, have different standards of what is considered appropriate or obscene.

SUMMARY OF THE INVENTION

The present invention pertains to a method of information distribution including developing a plurality of virtual communities from a plurality of clients on a network. Each one of the plurality of virtual communities self moderating the information distributed to the plurality of clients within each of the plurality of virtual communities.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An intended advantage of the embodiments disclosed herein is to provide a network of virtual communities based on discussion groups that are self moderated.

In the following description, numerous specific details are set forth such as examples of news protocols and networks in order to provide a thorough understanding of the present invention. It will be obvious, however, to one skilled in the art that these specific details need not be employed to practice the present invention. In other instances, well known software or hardware configurations have not been described in detail in order to avoid unnecessarily obscuring the present invention.

Figure 1:
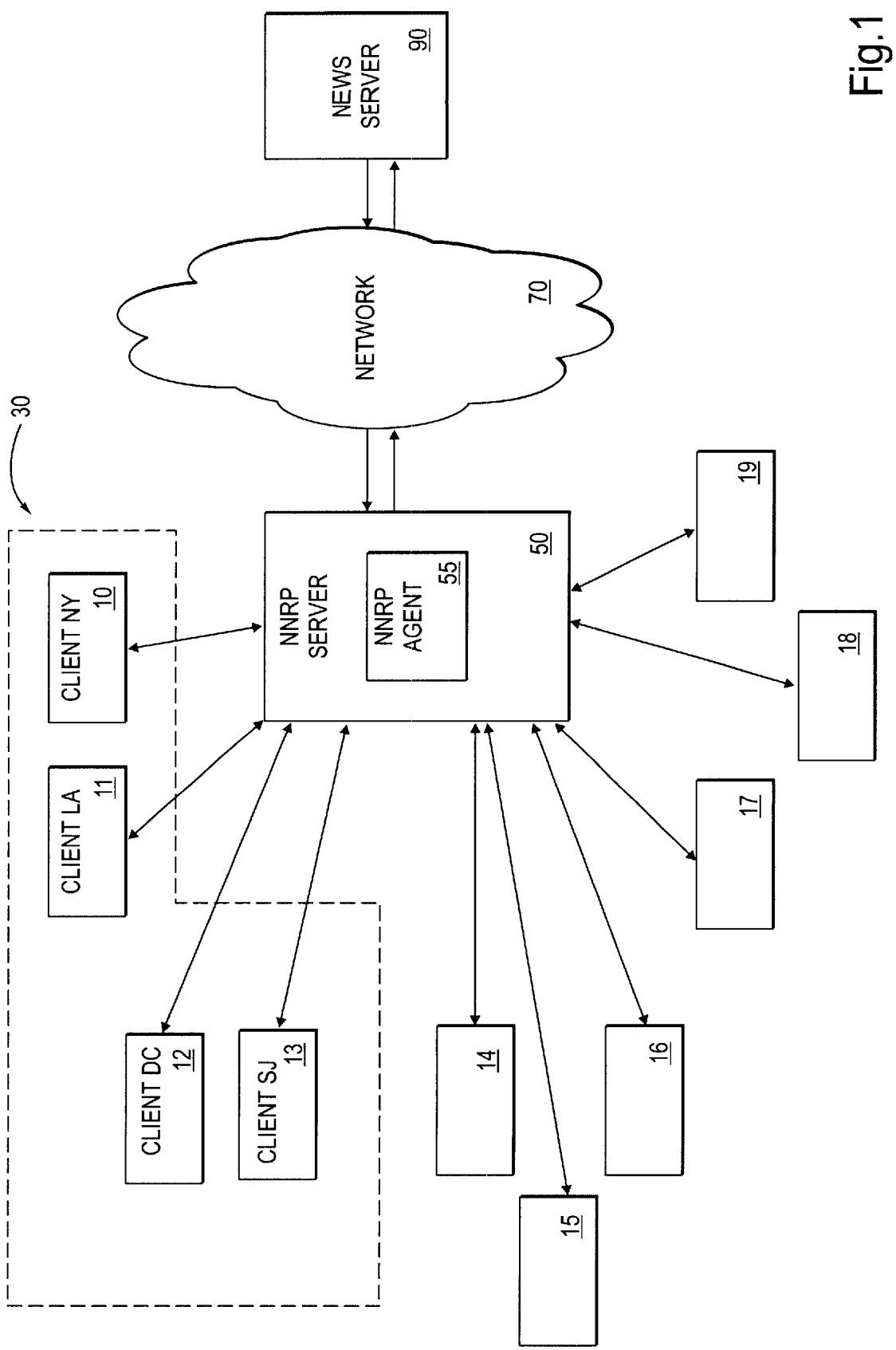
FIG. 1 illustrates a client server network having virtual servers in accordance with one embodiment of the present invention.

FIG. 1 illustrates a client server network having virtual servers in accordance with one embodiment of the present invention. Client (i.e., user) computers 10–19 communicate with a Net News Reading Protocol (NNRP) server 50 having a NNRP agent 55. The NNRP server 50 is a proxy caching server connected to a network 70. The network 70 may be an intranet, an internet, a wide area network, a local area network, or other network configuration. The network 70 is connected to a news server 90 containing articles on various topics. One embodiment of an NNRP server for receiving news from a news server is disclosed in co-pending U.S. patent application entitled, "HYBRID NEWS SERVER,"

application Ser. No. 09/263,587 filed on Mar. 5, 1999 which is incorporated herein by reference.

Figure 2:
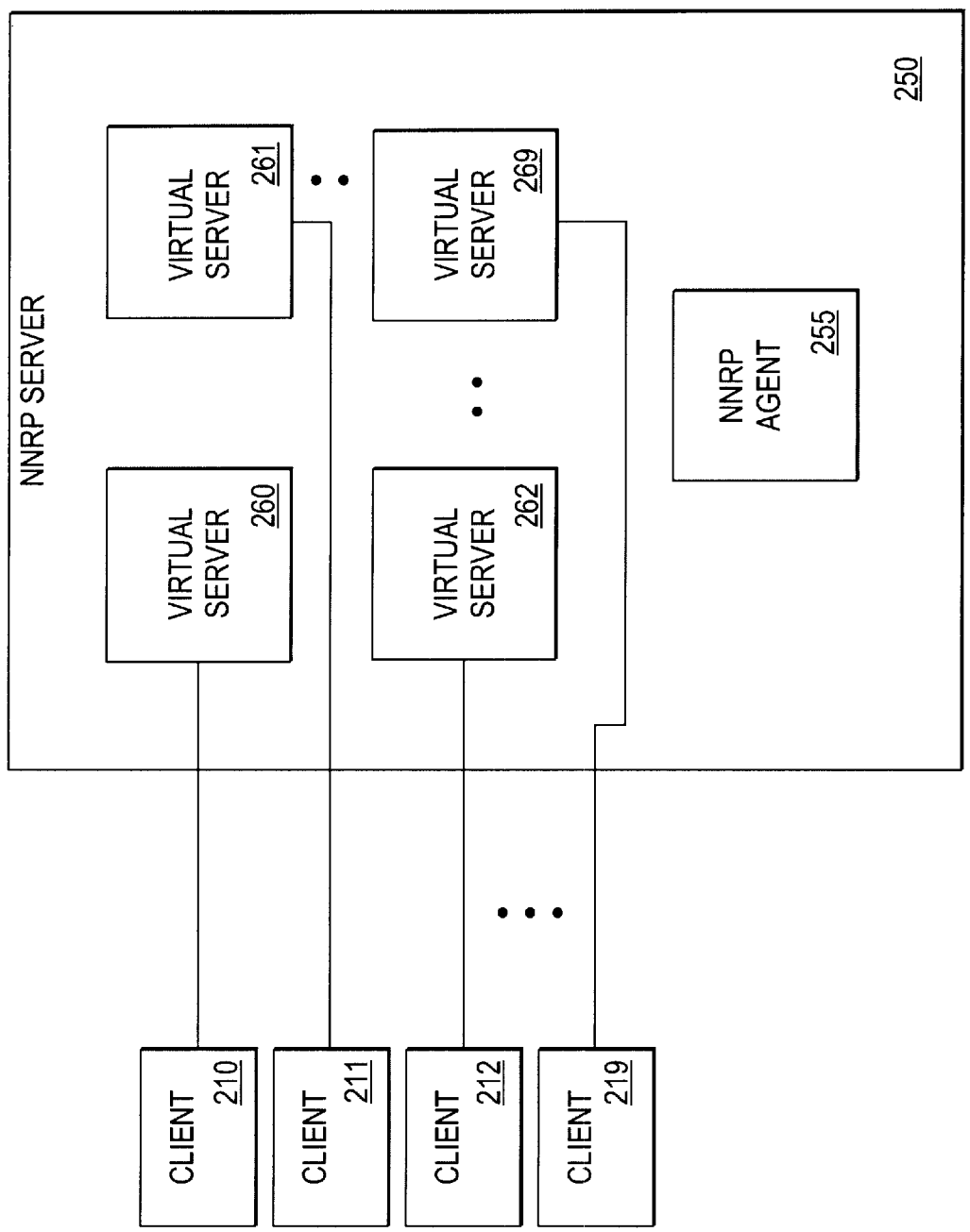
FIG. 2 illustrates virtual servers according to one embodiment of the present invention.

The NNRP agent 55 is a software plug-in for the NNRP server 50 that supports distribution and caching of client 10–19 information. It should be noted that ten clients are only shown for illustrative purposes. In other embodiments, the NNRP server can accommodate more clients. The NNRP agent 55 can be configured to support multiple connection profiles for different users. Individual user information is maintain in a database system on the NNRP server 50 that appears to each individual client as virtual servers 210–219 as illustrated in FIG. 2.

A virtual server is a collection of information that forms a logical view of a set of discussion groups. The virtual server provides facilities to clients of that view to rate or filter discussion groups based on the collective client's preferences. The client's preferences may include information such as a client's directory structure, log files, permissions lists, and authentication identification. In one embodiment, virtual server space is stored on multiple servers. When a client 210 accesses a virtual server 261, the NNRP server 250 dynamically switches to the client's set of access parameters. A virtual server is transparent to the client so that information access and transfers are performed automatically by the NNRP server 250 without the client's knowledge. The client accessing a virtual server is not aware that the virtual server is not a dedicated server such that there other clients 211–219 accessing information stored on the same NNRP server 250.

The NNRP agent 255 allows the NNRP server 250 to manage each client's connection to their respective virtual server. In addition to authenticating the client, the NNRP agent 255 can return profile information allowing extended features and services on an individual client or client group basis.

Use of virtual servers with the NNRP agent 255 allows the establishment of virtual communities. Clients can be grouped into self selected virtual communities. Individual clients assigned to a virtual community may set their own group filtering and rating preferences. Referring again to FIG. 1, the virtual communities are not necessarily determined by the geographic location of the clients. Virtual community 30, for example, consists of a client in New York 10, a client in Los Angeles 11, a client in Washington D.C. 12, and a client in San Jose 13. Although geographically separated, the clients form a community in regards to information that is shared among the community clients. In another embodiment, however, virtual communities are established based on geographic location of the clients.

Clients in these virtual communities can self select policies, as well as their own filtering options for the articles distributed within their virtual community. In one embodiment, only clients of within a virtual community are allowed to post new articles to the community, thereby providing an efficient means of monitoring abusive users. Such a scheme gives server administrators, such as internet service providers (ISP), corporations, or affinity groups, an opportunity to provide valuable content to users while enabling undesired material to be excluded based on a community and client profiles rather than the standards imposed by a server administrator.

Figure 3:
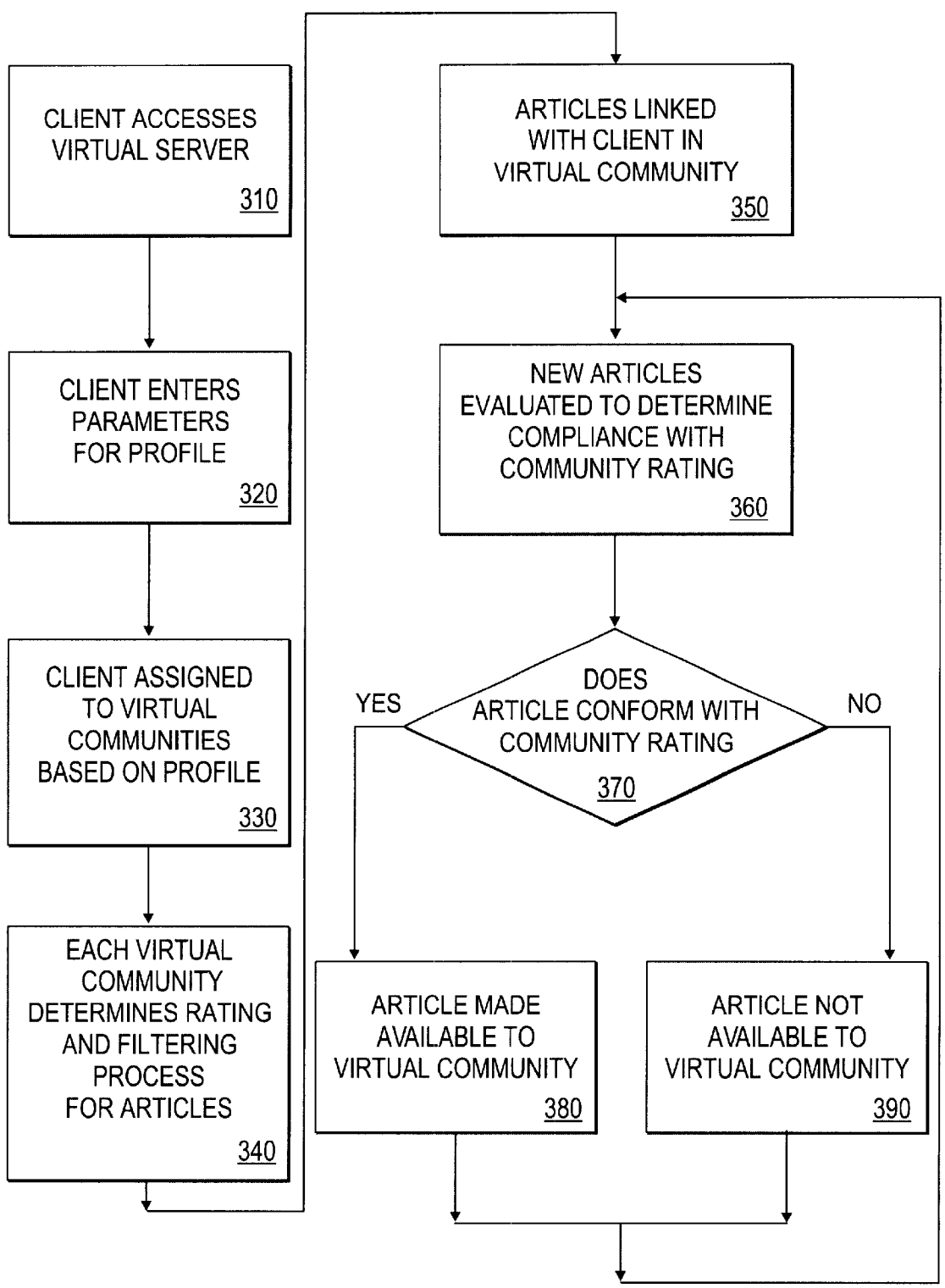
FIG. 3 illustrates a virtual community process according to one embodiment of the present invention.

FIG. 3 illustrates a virtual community process according to one embodiment of the present invention. A client accesses the NNRP server which allocates space appearing as a virtual server to the client, 310. The client then enters parameters that the NNRP agent will use to establish a profile for the client, 320. The NNRP agent assigns the client to virtual communities on the NNRP server based on the client's profile, 330. The clients of a virtual community determine ratings and filtering procedures for articles to be distributed within their own virtual community, 340. Each virtual communities is its own groups such that filter is performed at the group level rather than the article level. As such, articles may be removed by a community group if that group deems it to be offensive. The NNRP agent links articles and sets of article groups from news servers with the virtual community clients based on the self selected community's policies, 350. Any new articles or article group obtained from news servers or posted by community member clients are evaluated by the NNRP agent to determine if they comply with the a virtual communities' standards, 360.

In one embodiment, if the article group conforms with a virtual community's standards, the NNRP agent will make the article group available to the virtual community's clients, 380. If the article group does not conform with a particular virtual community's standard, then the NNRP agent prevents the community's clients from accessing those articles, 390. The process is repeated beginning with step 360 as new articles or article groups become available.

In one embodiment, a client assigned to a particular virtual community (e.g., by an ISP or a corporation) can modify his own profile in order to access additional virtual community groups. In another embodiment, clients can additionally filter articles within their assigned virtual communities. For example, if an employer develops an intranet virtual community allowing access to a set of article groups, employees within that virtual community can alter their own client profiles to be able to additionally filter articles within the set of article groups that only pertains to their area of interest. In addition, the set of article groups for the virtual community cannot be overwritten by the clients within the virtual community.

In another embodiment, clients can define sub profiles allowing for multiple access to the NNRP server, for example, to enable a parent to access a particular discussion group while preventing a child's access to that discussion group.

In yet another embodiment, separate virtual communities can be aggregated together to appear as a single virtual community to users based on their area of interest defined in their user profiles. For example, if a client's profile correlates with a first virtual community with a first rating and a second virtual community with a second rating, the NNRP agent can combine the two virtual communities with the appropriate ratings to appear as a single virtual community to the client.

In the virtual communities, because the discussion groups are self moderated the responsibility of determining what is obscene is transferred to a moderation process within the virtual communities. The NNRP agent together with the NNRP server provides the ability to have the virtual communities assign ratings to the discussion groups and allows individual users to select particularly rated discussions based on their own client profiles. With clients possibly spread out across the country and the world, this scheme may eliminate a service provider's policing of, in effect, a nationwide standard by enabling clients to establish virtual communities with self defined community standards of obscenity.

Figure 4:
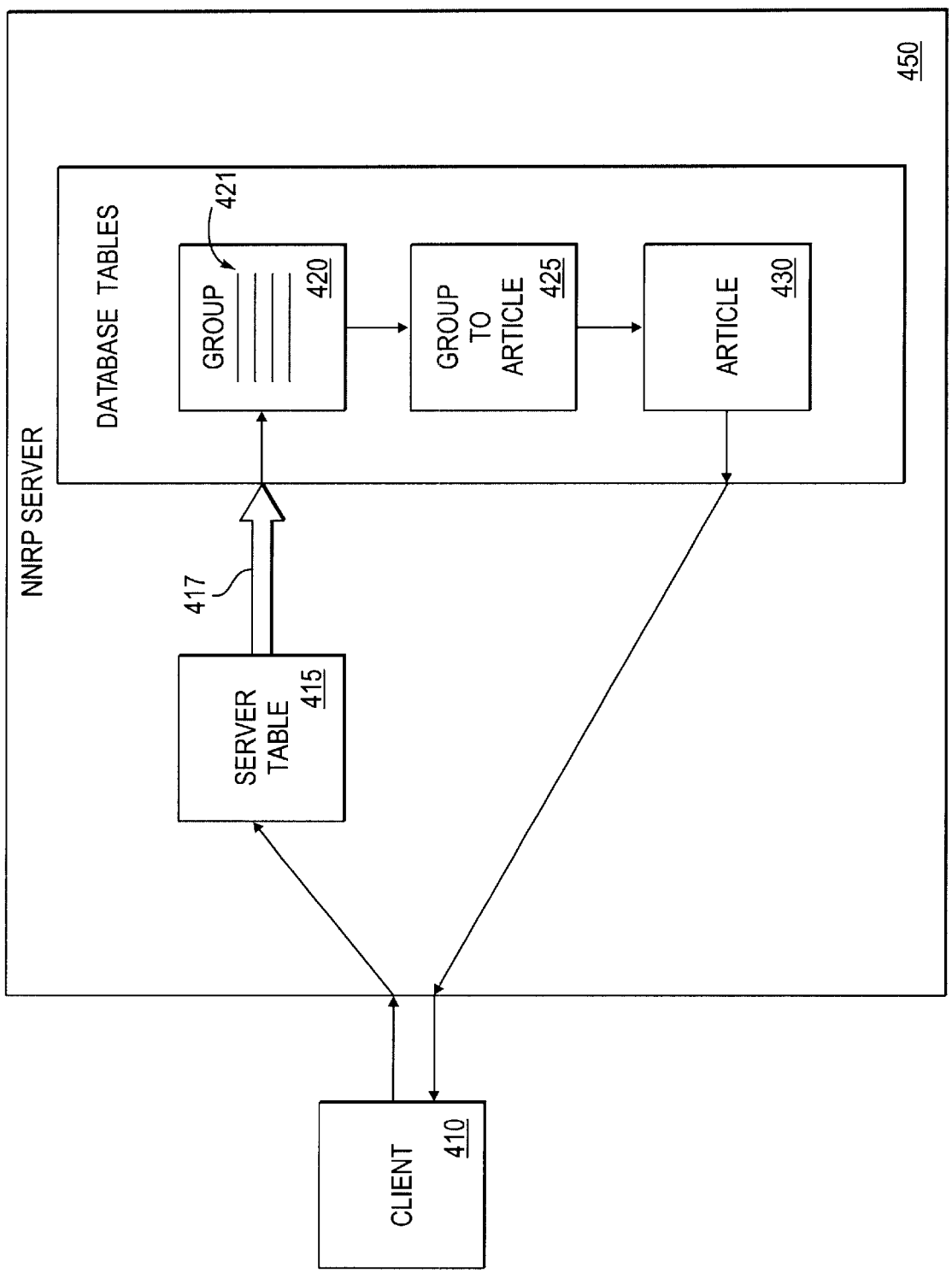
FIG. 4 illustrates a structure of a server enabling virtual communities according to one embodiment of the present invention.

FIG. 4 illustrates a structure of a NNRP server enabling virtual communities according to one embodiment of the present invention. A client 410 establishes a connection to NNRP server 450 having a server table 415. The server table 415 contains entries including locations from where to retrieve articles, locations to which articles should be posted, identification information, formats of how articles are displayed to clients, and client profiles. The server table 415 has links 417 to database tables: group table 420, group to article table 425, and article table 430.

In one embodiment, a virtual community is established by defining an identification for the virtual community and a group identification for clients (e.g., client 410) within the virtual community. As such every group will have a row 421 in the group table 420 that establishes which groups are available for a given virtual community. The community identification together with the group identification form a unique set that establishes what articles will be available to users in that community. The group to article table 425 provides a link between the groups and the articles to be provided for that group. The article table 430 provides a listing of the actual articles on NNRP server 450.

Figure 5:
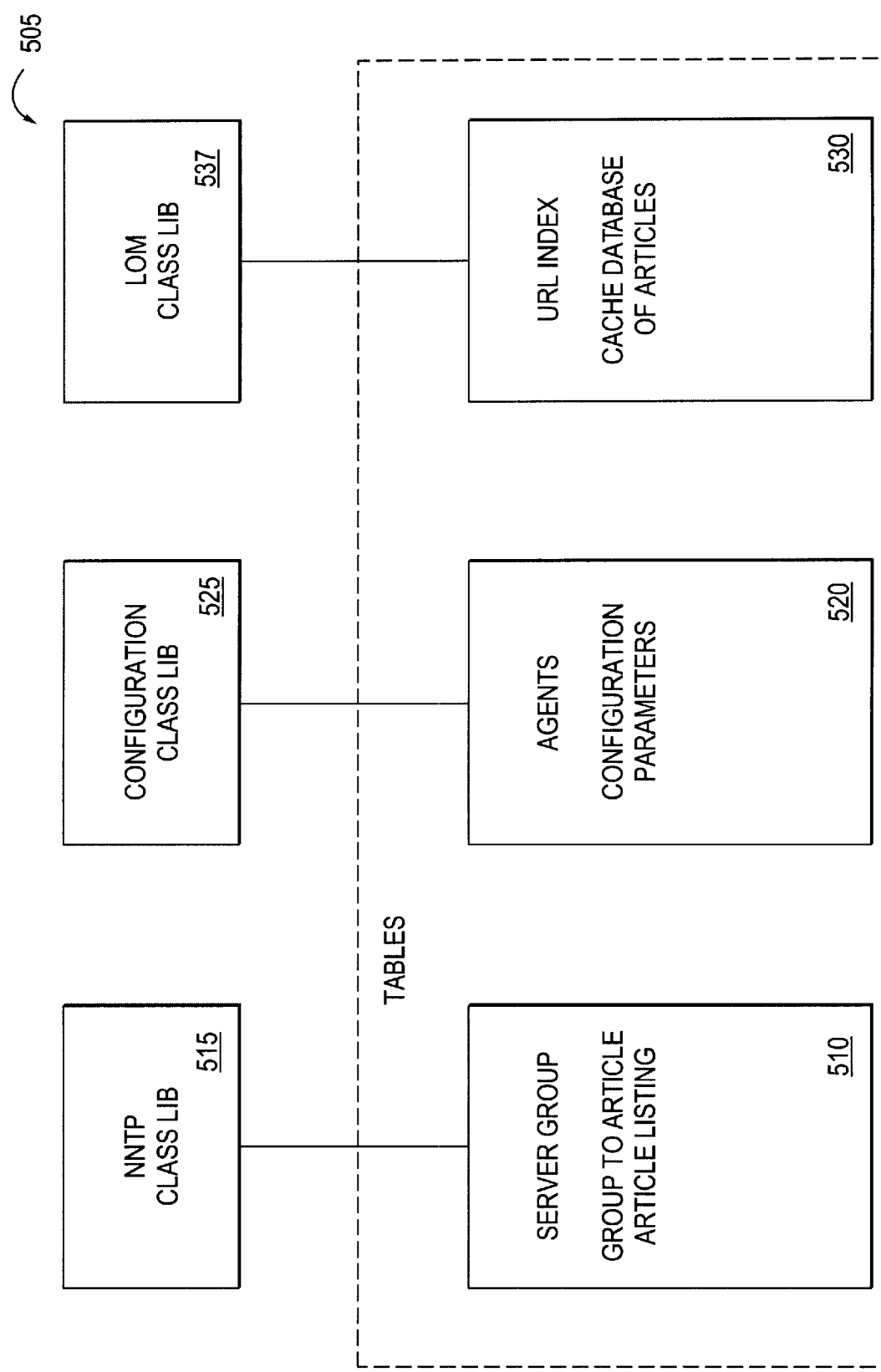
FIG. 5 illustrates a structure for a server according to one embodiment of the present invention.

FIG. 5 illustrates software components for a NNRP server 505 according to another embodiment of the present invention. The software components include three databases: a network news transfer protocol (NNTP) database (DB) 510, a configuration database 520, and a local object manager (LOM) database 530. The NNTP database 510 stores, the links between the groups and articles, the list of articles available to the communities, and the virtual server information similar to that discussed above for server table 415 of FIG. 4. A news database class library 515 provides the software routines through which new database 510 may be accessed. In one embodiment, the news database class library 515 is an open API that allows server administrators to develop custom news agent program modules to access the underlying news database 515.

The configuration database 520 stores configuration information that determines how the NNTP database information will be interpreted by the agents (e.g., the NNRP agent). The configuration database 520 also includes a configuration database class library 525 which acts as an interface to the underlying configuration database 520 information.

The LOM database 530 stores the group articles, tracks the multiple caches used to store articles, and stores data that enables client access to the NNRP server. Access to LOM 530 is provided by local object class library 537. In one embodiment, the databases are modular such that new applications can be inserted on NNRP server to access the underlying databases.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of information distribution among a plurality of virtual communities, comprising:

developing the plurality of virtual communities from a plurality of clients on a network;

establishing a profile for each of the plurality of clients;

forming a first virtual community from the plurality of virtual communities with a first group of clients out of the plurality of clients based on the profile;

assigning a first group of ratings to the first virtual community based on the profile;

assigning a first rating to a first set of article groups; and providing the first virtual community with access to the first set of article groups if the first rating of the first set of article groups is within the first group of ratings of the first virtual community.

2. The method of claim 1 further comprising permitting the first group of clients of the first virtual community to evaluate the information; and providing the first virtual community with access to the information if the information is evaluated to be within a standard of the first virtual community.

3. A method of server operation, comprising:

connecting a plurality of clients to the server;

establishing a profile for each of the plurality of clients;

forming a first virtual community with a first group of clients out of the plurality of clients based on the profile for each of the plurality of clients;

assigning a first group of ratings to the first virtual community based on the profile for each of the plurality of clients;

assigning a first rating to a first set of article groups; and providing the first virtual community with access to the first set of article groups if the first rating of the first set of article groups is within the first group of ratings of the first virtual community.

4. The method of claim 3, wherein the server is a NNRP server.

5. The method of claim 3, wherein assigning a first rating to the first set of article groups comprises permitting the one or more clients of the first virtual community to evaluate the first group of articles, the one or more clients evaluating the first set of article groups determined by a majority of the first group of clients in the first virtual community.

6. The method of claim 3, further comprising receiving a new profile from one client of the plurality of clients, and assigning the one client to another virtual community based on the new profile.

7. The method of claim 3, further comprising:

forming a second virtual community with a second group of clients out of the plurality of clients based on the profile for each of the plurality of clients;

assigning a second group of ratings to the second virtual community based on the profile for each of the plurality of clients; and providing access to the first set of article groups if the rating of the first set of article groups is within the second group of ratings of the second virtual community.

8. The method of claim 7, wherein one of the plurality of clients in the first virtual community is also in the second virtual community.

9. The method of claim 8, further comprising:

producing a second set of article groups;

assigning a second rating to the second set of article groups; and providing access to the second set of article groups if the rating of the second set of article groups is within the first group of ratings of the first virtual community.

10. The method of claim 7, further comprising aggregating the first virtual community with the second virtual community to appear as a single virtual community to one of the plurality of clients.

11. The method of claim 3, further comprising establishing a sub profile for one of the plurality of clients.

* * * * *